(12) United States Patent
Makino et al.

(10) Patent No.: US 12,333,199 B2
(45) Date of Patent: Jun. 17, 2025

(54) INFORMATION PROCESSING DEVICE AND INFORMATION PROCESSING PROGRAM

(71) Applicant: FUJIFILM CORPORATION, Tokyo (JP)

(72) Inventors: Yohei Makino, Kanagawa (JP); Yuji Onozawa, Kanagawa (JP); Takafumi Haruta, Kanagawa (JP); Tatsuo Fukushima, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/686,453

(22) PCT Filed: Aug. 3, 2022

(86) PCT No.: PCT/JP2022/029793
§ 371 (c)(1),
(2) Date: Feb. 26, 2024

(87) PCT Pub. No.: WO2023/047811
PCT Pub. Date: Mar. 30, 2023

(65) Prior Publication Data
US 2025/0053360 A1 Feb. 13, 2025

(30) Foreign Application Priority Data
Sep. 21, 2021 (JP) ................. 2021-153036

(51) Int. Cl.
*G06F 3/14* (2006.01)
*G06F 3/04817* (2022.01)

(52) U.S. Cl.
CPC ............ *G06F 3/14* (2013.01); *G06F 3/04817* (2013.01)

(58) Field of Classification Search
CPC ............................... G06F 3/14; G06F 3/04817
See application file for complete search history.

(56) References Cited

U.S. PATENT DOCUMENTS

| 10,891,676 | B1* | 1/2021 | Kan ................... G06Q 30/0643 |
| 2013/0047080 | A1* | 2/2013 | Kroeger .............. G06F 3/04883 715/273 |
| 2017/0085731 | A1 | 3/2017 | Akuzawa |
| 2018/0220015 | A1* | 8/2018 | Akuzawa ........... H04N 1/00474 |
| 2020/0218442 | A1* | 7/2020 | Shin ...................... G06F 3/0488 |

FOREIGN PATENT DOCUMENTS

| JP | 2012-33009 A | 2/2012 |
| JP | 2018-125686 A | 8/2018 |
| JP | 2021-128481 A | 9/2021 |

* cited by examiner

*Primary Examiner* — Sahlu Okebato
(74) *Attorney, Agent, or Firm* — SOLARIS Intellectual Property Group, PLLC

(57) ABSTRACT

An information processing device includes a processor, in which the processor is configured to: receive a setting value of a predetermined function, and cause a display unit to display identification information which is determined according to the setting value and with which a content of the predetermined function to be executed according to the setting value is identifiable.

8 Claims, 16 Drawing Sheets

FIG.4

| USE PURPOSE | USE PURPOSE NAME |
|---|---|
| COST | COST SAVING |
| QUALITY | HIGH QUALITY |
| SECURITY | SECURITY FUNCTION ENABLED |

FIG.5A

FOR COPY — USE PURPOSE

| SETTING ITEM | COST | QUALITY |
|---|---|---|
| NUMBER OF COPIES | ○ | |
| COLOR MODE | ○ | |
| SCALE | | ○ |
| IMAGE QUALITY | | ○ |
| DOUBLE-SIDED | ○ | |
| Nup | ○ | |

FIG.5B

FOR FAX — USE PURPOSE

| SETTING ITEM | COST | QUALITY | SECURITY |
|---|---|---|---|
| RECIPIENT | | | ○ |
| TIME DESIGNATION | ○ | | |
| IMAGE QUALITY | | ○ | |
| TRANSMISSION SHEET | | ○ | |
| DENSITY | | ○ | |
| DOUBLE-SIDED | ○ | | |
| RECIPIENT CONFIRMATION | | | ○ |

FIG.5C

FOR SCAN — USE PURPOSE

| SETTING ITEM | COST | QUALITY | SECURITY |
|---|---|---|---|
| RECIPIENT | | | ○ |
| FILE FORMAT | | ○ | |
| RESOLUTION | | ○ | |
| DOUBLE-SIDED | ○ | | |
| TRANSMISSION ADDRESS | | | ○ |
| FILE ENCRYPTION | | | ○ |

FIG.6

FOR FAX  ←—— USE PURPOSE ——→

| SETTING ITEM | COST | QUALITY | SECURITY | SCORE |
|---|---|---|---|---|
| RECIPIENT | | | ○ | 2 |
| TIME DESIGNATION | ○ | | | 3 |
| IMAGE QUALITY | | ○ | | 1 |
| TRANSMISSION SHEET | | ○ | | 1 |
| DENSITY | | ○ | | 1 |
| DOUBLE-SIDED | ○ | | | 3 |
| RECIPIENT CONFIRMATION | | | ○ | 2 |

FIG.7

FOR FAX

USE PURPOSE ↕

| SETTING ITEM | COST | QUALITY | SECURITY | SCORE | BEFORE CHANGE | AFTER CHANGE |
|---|---|---|---|---|---|---|
| RECIPIENT | | | ○ | 2 | UNSPECIFIED | SPECIFIED |
| TIME DESIGNATION | ○ | | | 3 | UNDESIGNATED | UNDESIGNATED |
| IMAGE QUALITY | | ○ | | 1 | STANDARD | HIGH IMAGE QUALITY |
| TRANSMISSION SHEET | | ○ | | 1 | NONE | PRESENT |
| DENSITY | | ○ | | 1 | STANDARD | STANDARD |
| DOUBLE-SIDED | ○ | | | 3 | ONE-SIDED | ONE-SIDED |
| RECIPIENT CONFIRMATION | | | ○ | 2 | DISABLED | ENABLED |

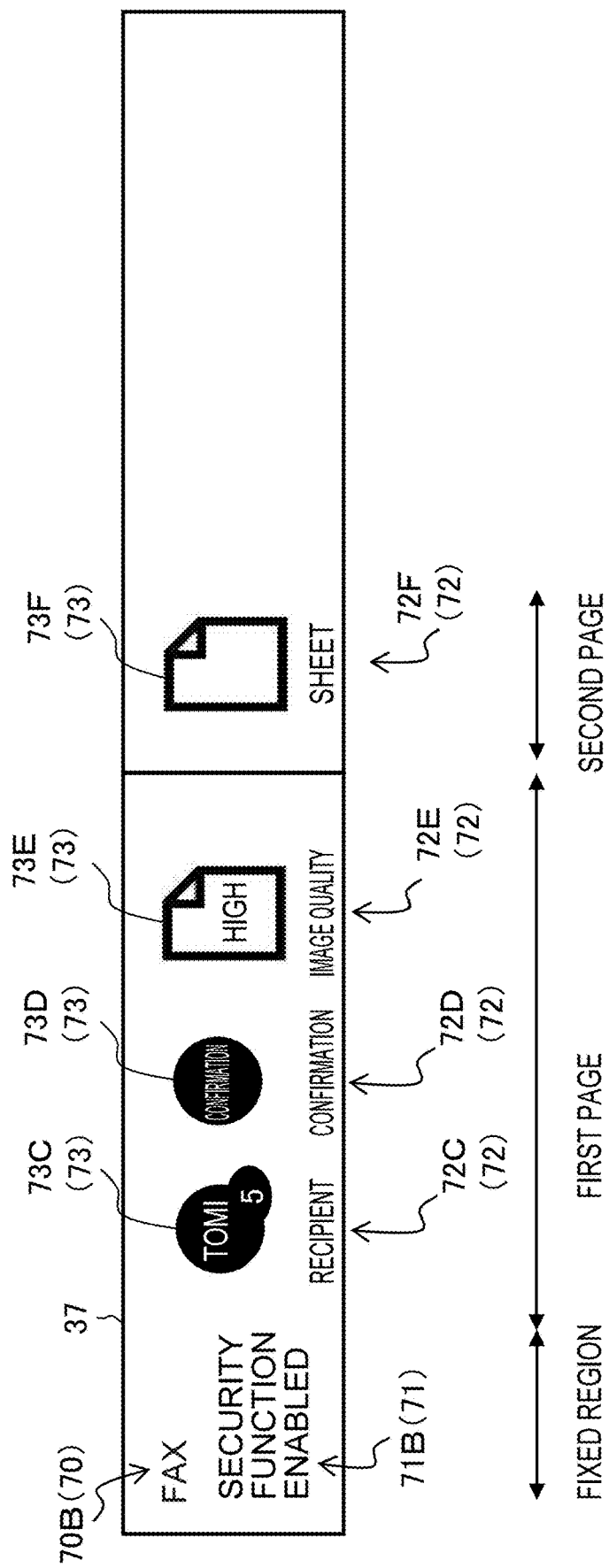

FIG. 15A

FOR FAX

← USE PURPOSE →

| SETTING ITEM | COST | QUALITY | SECURITY | SCORE | BEFORE CHANGE | AFTER CHANGE |
|---|---|---|---|---|---|---|
| RECIPIENT | | | ○ | 2 | UNSPECIFIED | SPECIFIED |
| TIME DESIGNATION | ○ | | | 3 | UNDESIGNATED | UNDESIGNATED |
| IMAGE QUALITY | | ○ | | 1 | STANDARD | HIGH IMAGE QUALITY |
| TRANSMISSION SHEET | | ○ | | 1 | NONE | PRESENT |
| DENSITY | | ○ | | 1 | STANDARD | STANDARD |
| DOUBLE-SIDED | ○ | | | 3 | ONE-SIDED | ONE-SIDED |
| RECIPIENT CONFIRMATION | | | ○ | 2 | DISABLED | ENABLED |

FIG. 15B

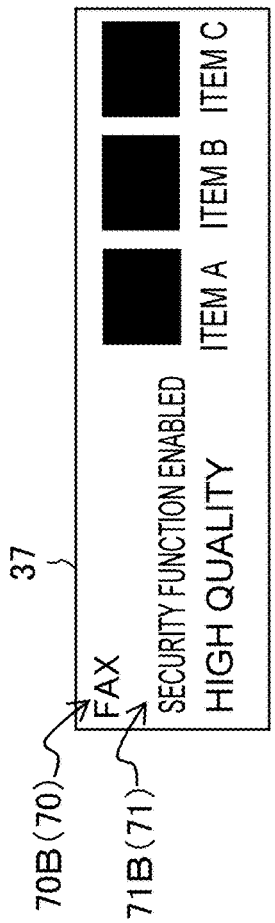

FIG.16

| USE PURPOSE | EACH TYPE OF FUNCTION | SETTING ITEM | USE PURPOSE NAME |
|---|---|---|---|
| COST | COPY | COLOR MODE | TONER SAVING |
| | | DOUBLE-SIDED OR Nup | PAPER SAVING |
| QUALITY | | IMAGE QUALITY | HIGH IMAGE QUALITY |
| COST | FAX | TIME DESIGNATION (CASE WHERE SET TIME IS NIGHT TIME) | LOW COST TRANSMISSION |
| QUALITY | | PRE-VIEW | CONFIRMATION BEFORE TRANSMISSION |
| SECURITY | | RECIPIENT CHECK | PREVENTION OF ERRONEOUS TRANSMISSION |
| SECURITY | SCAN | FILE ENCRYPTION | SECURE TRANSMISSION |

INFORMATION PROCESSING DEVICE AND INFORMATION PROCESSING PROGRAM

TECHNICAL FIELD

The present disclosure relates to an information processing device and an information processing program.

BACKGROUND ART

Japanese Patent Application Laid-Open (JP-A) No. 2018-125686 discloses a technique of receiving an instruction to register a job setting corresponding to a selected job setting history as a frequently used setting in accordance with selection of the setting history.

SUMMARY OF INVENTION

Technical Problem

Hitherto, in an image forming device, setting values of a color mode, a resolution, a transmission destination, and the like can be set for various predetermined functions such as copy, scan, and fax. At this time, it is desirable to display identification information such as a name so that a content of each type of function to be executed according to the setting value can be identified in the case of setting the setting values.

Here, in the case of displaying all the setting values in the form of text strings as the identification information, the sizes of the displayed texts decrease, as a result of which there is a possibility that the content of each type of function to be executed according to the setting value cannot be identified from the text strings. In addition, in the case of displaying only some of the setting values in the form of text strings as the identification information without decreasing the sizes of the displayed texts, there is a possibility that the content of each type of function to be executed according to the setting value cannot be identified only by information of the text strings.

Therefore, an object of the present disclosure is to allow a user to identify a content of a function to be executed according to a setting value from information displayed on a display unit.

Solution to Problem

An information processing device according to a first aspect includes a processor, in which the processor is configured to: receive a setting value of a predetermined function, and cause a display unit to display identification information which is determined according to the setting value and with which a content of the predetermined function to be executed according to the setting value is identifiable.

An information processing device according to a second aspect is the information processing device according to the first aspect, in which the processor is configured to cause the display unit to display, in text, at least one of a type of the predetermined function, a purpose of using the setting value, or a setting item indicating the setting value, as the identification information.

An information processing device according to a third aspect is the information processing device according to the second aspect, in which the identification information includes the type of the predetermined function, the purpose, and the setting item, and the processor is configured to cause the display unit to display the type of the predetermined function at a foremost portion of the display unit in a predetermined direction.

An information processing device according to a fourth aspect is the information processing device according to the first aspect, in which the processor is configured to cause the display unit to display, as an icon, at least one of a type of the predetermined function or a setting item indicating the setting value, as the identification information.

An information processing device according to a fifth aspect is the information processing device according to the fourth aspect, in which the processor is configured to cause the display unit to display, as text and an icon, the type of the predetermined function as the identification information.

An information processing device according to a sixth aspect is the information processing device according to the fourth or fifth aspect, in which the processor is configured to cause the display unit to display, as an icon, the setting item, the setting value of which has been changed from the setting value serving as a reference for the predetermined function, as the identification information.

An information processing device according to a seventh aspect is the information processing device according to any one of the first to sixth aspects, in which the processor is configured to perform carousel display for the identification information in a case in which the identification information is not entirely displayable on one screen of the display unit.

An information processing program according to an eighth aspect executable by a computer to perform processing including: receiving a setting value of a predetermined function; and causing a display unit to display identification information which is determined according to the setting value and with which a content of the predetermined function to be executed according to the setting value is identifiable.

Advantageous Effects of Invention

According to the first and eighth aspects, it is possible to allow the user to identify the content of the function to be executed according to the setting value from the information displayed on the display unit.

According to the second aspect, it is possible to allow the user to identify at least one of the type of the predetermined function, the use purpose, or the setting item from the text displayed on the display unit.

According to the third aspect, it is possible to allow the user to easily identify the predetermined function corresponding to the setting from the information displayed on the display unit as compared with a configuration in which the type of the predetermined function is displayed at a portion other the foremost portion of the display unit in the predetermined direction.

According to the fourth aspect, it is possible to allow the user to identify at least one of the type of the predetermined function or the setting item from the icon displayed on the display unit.

According to the fifth aspect, it is possible to allow the user to identify the type of the predetermined function from the icon and the text displayed on the display unit.

According to the sixth aspect, the amount of information to be displayed on the display unit can be reduced as compared with a configuration in which the setting items corresponding to all the setting values of the setting are displayed.

According to the seventh aspect, it is possible to allow the user to easily identify each piece of identification informa-

BRIEF DESCRIPTION OF DRAWINGS

FIG. 4 is a first explanatory diagram showing a relationship between a use purpose and a use purpose name.

FIG. 5A is an explanatory diagram showing a relationship between a setting item for copy and a use purpose.

FIG. 5B is an explanatory diagram showing a relationship between a setting item for fax and a use purpose.

FIG. 5C is an explanatory diagram showing a relationship between a setting item for scan and a use purpose.

FIG. 6 is an explanatory diagram showing a score assigned according to each use purpose for fax.

FIG. 7 is a first explanatory diagram showing setting values changed from reference setting values.

FIG. 9 is a first explanatory diagram of carousel display.

FIG. 15A is a second explanatory diagram showing setting values changed from reference setting values.

FIG. 15B shows a display example of a display unit of the image forming device.

FIG. 16 is a second explanatory diagram showing a relationship between a use purpose and a use purpose name.

DESCRIPTION OF EMBODIMENTS

Hereinafter, an image forming device 20 as an example of an information processing device according to the present embodiment will be described.

First Embodiment

Figure 1:
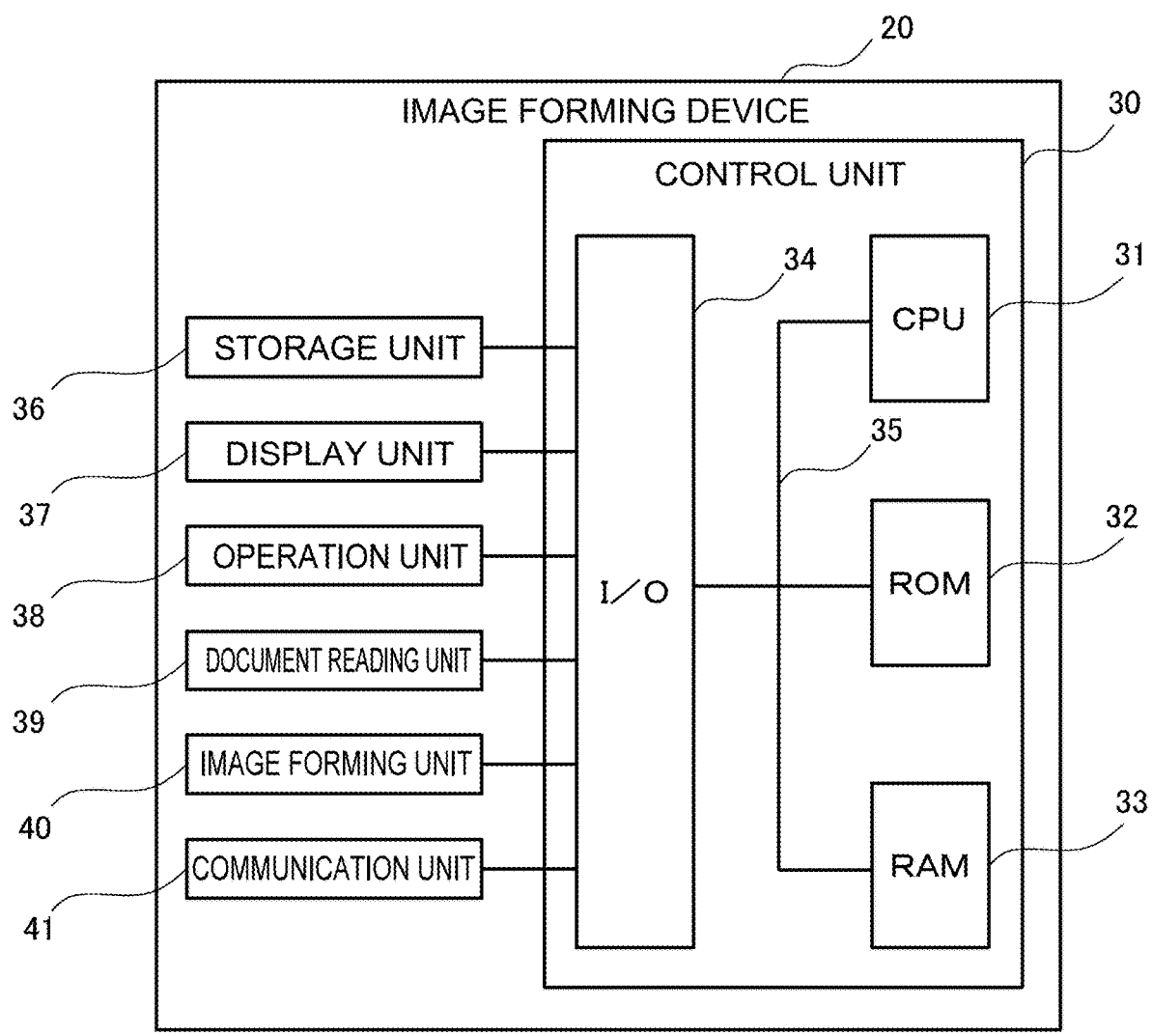
FIG. 1 is a block diagram showing a hardware configuration of an image forming device.

FIG. 1 is a block diagram showing a hardware configuration of the image forming device 20.

As shown in FIG. 1, the image forming device 20 includes a control unit 30 that controls an operation of the image forming device 20. In the control unit 30, a central processing unit (CPU) 31, a read only memory (ROM) 32, a random access memory (RAM) 33, and an input/output interface (I/O) 34 are communicably connected to one another via a bus 35.

The CPU 31 is a central processing unit, executes various programs, and controls each unit. That is, the CPU 31 reads a program from the ROM 32 or a storage unit 36 described below and executes the program using the RAM 33 as a work area. The CPU 31 controls each of the components and executes various types of arithmetic processing according to a program recorded in the ROM 32 or the storage unit 36. The CPU 31 is an example of a "processor".

The ROM 32 stores various programs and various data. The RAM 33 functions as a work area and temporarily stores a program or data.

The storage unit 36, a display unit 37, an operation unit 38, a document reading unit 39, an image forming unit 40, and a communication unit 41 are connected to the I/O 34. These units can communicate with the CPU 31 via the I/O 34.

The storage unit 36 is implemented by a storage device such as a hard disk drive (HDD), a solid state drive (SSD), or a flash memory, and stores various programs and various data. In the first embodiment, the storage unit 36 stores at least an information processing program for executing display processing described below. The information processing program may be installed in the image forming device 20 in advance, or may be installed in the image forming device 20 by being stored in a nonvolatile storage medium or distributed via a network, if appropriate. Examples of the nonvolatile storage medium include a CD-ROM, a magneto-optical disk, an HDD, a DVD-ROM, a flash memory, and a memory card.

For example, a liquid crystal display or an organic electro luminescence (EL) display is used as the display unit 37. The display unit 37 integrally includes a touch panel. The display unit 37 is an example of a "display unit".

The operation unit 38 is provided with various operation keys such as a numeric keypad and a start key.

The display unit 37 and the operation unit 38 receive various instructions from a user of the image forming device 20. Examples of the various instructions include an instruction for starting printing of a document and an instruction for starting copying of a document. The display unit 37 displays various types of information such as a result of processing executed in response to an instruction received from the user and a notification for the processing.

The document reading unit 39 takes in, one by one, documents placed on a feeding tray of an automatic document feeder (not shown) provided at an upper portion of the image forming device 20 and optically reads the taken-in document to obtain image information. Alternatively, the document reading unit 39 optically reads a document placed on a document platen such as a platen glass to obtain image information.

The image forming unit 40 forms, on a recording medium such as paper, an image based on image information obtained by reading performed by the document reading unit 39 or image information obtained from an external personal computer (PC) or the like connected via the network.

The communication unit 41 is an interface for communicating with another device. For example, a wired communication standard such as Ethernet (registered trademark) or FDDI, or a wireless communication standard such as 4G, 5G, or Wi-Fi (registered trademark) is used for the communication.

The image forming device 20 executes processing based on the information processing program by using the hardware resources when executing the information processing program.

Figure 2:
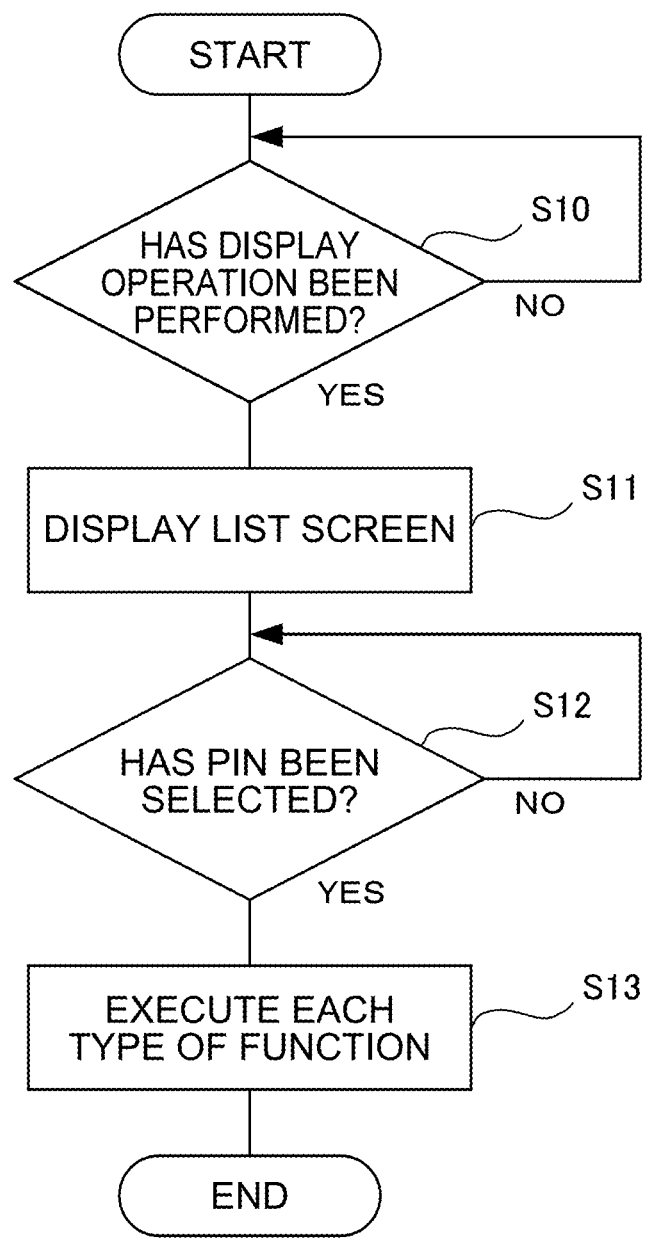
FIG. 2 is a flowchart showing a flow of display processing in the image forming device.

FIG. 2 is a flowchart showing a flow of display processing of causing the display unit 37 to display identification information which is determined according to a setting value of a favorite setting and with which the content of each type of function executed according to the setting value can be identified, the display processing being executed by the image forming device 20. The CPU 31 reads the information processing program from the storage unit 36, loads the information processing program onto the RAM 33, and executes the information processing program to execute the display processing.

Each type of function is a function provided by the image forming device 20, and includes, for example, print, copy, scan, fax, and the like. The each type of function is an example of a "predetermined function".

The favorite setting is a setting in which arbitrary setting values such as setting values frequently used by the user or favorite setting values of the user are registered for setting items described below in each type of function of the image forming device 20. Hereinafter, a target registered in the favorite setting is referred to as a "pin".

In the first embodiment, the number of user operations for executing each type of function is reduced as compared with a case where no pin is used, by using the pin registered in the favorite setting. Specifically, in the first embodiment, once the user selects a desired pin from a list screen showing a list of pins, a setting value of the pin is invoked, and each type of function is executed according to the setting value.

The identification information is information with which the content of each type of function executed according to the setting value of the pin can be identified.

In step S10 shown in FIG. 2, the CPU 31 determines whether or not a display operation, which is an operation for displaying the list screen, has been performed, and in a case where it is determined that the display operation has been performed (step S10: YES), the processing proceeds to step S11. On the other hand, in a case where it is determined by the CPU 31 that the display operation has not been performed (step S10: NO), the processing waits until the display operation is performed. As an example, the CPU 31 determines that the display operation has been performed in a case where an operation of an icon 63 is received on a change screen described below or in a case where an operation of an icon 68 is received on a setting screen described below.

In step S11, the CPU 31 displays the list screen on the display unit 37. Then, the processing proceeds to step S12. In the first embodiment, the CPU 31 displays the pin and the identification information corresponding to the pin on the list screen. A display example of the list screen on the display unit 37 will be described later.

In step S12, the CPU 31 determines whether or not selection of the pin has been received, and in a case where it is determined that the selection has been received (step S12: YES), the processing proceeds to step S13. On the other hand, in a case where it is determined by the CPU 31 that the selection of the pin has not been received (step S12: NO), the processing waits until the selection is received.

In step S13, the CPU 31 executes each type of function according to the setting value of the pin selected in step S12. Then, the display processing ends.

Next, a display example displayed on the display unit 37 of the image forming device 20 will be described.

Figure 3A:
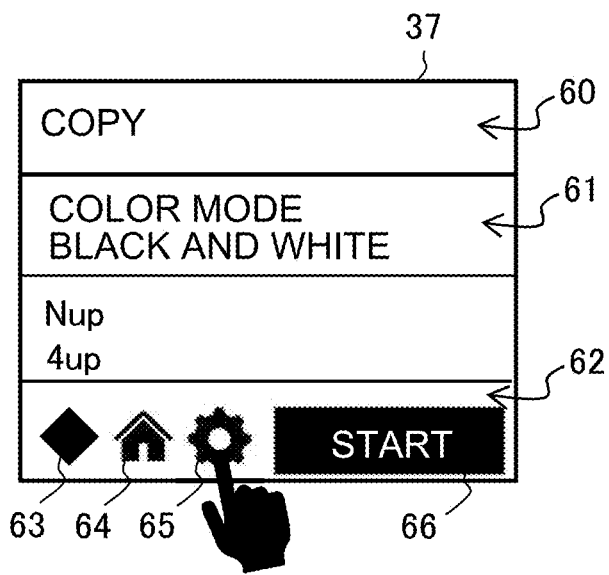
FIG. 3A shows a display example of a change screen.
Figure 3B:
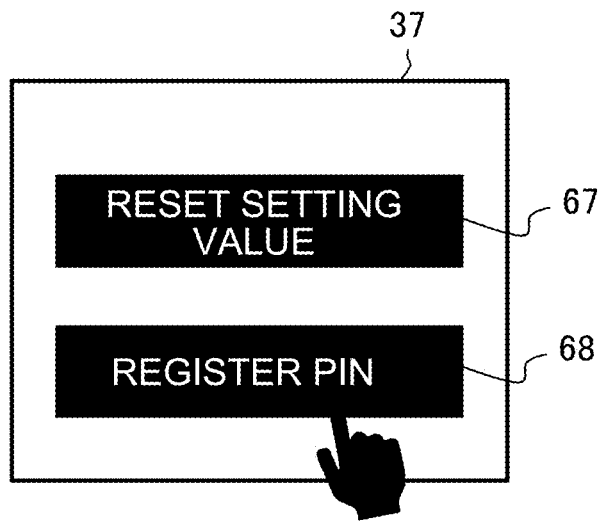
FIG. 3B shows a display example of a setting screen.
Figure 3C:
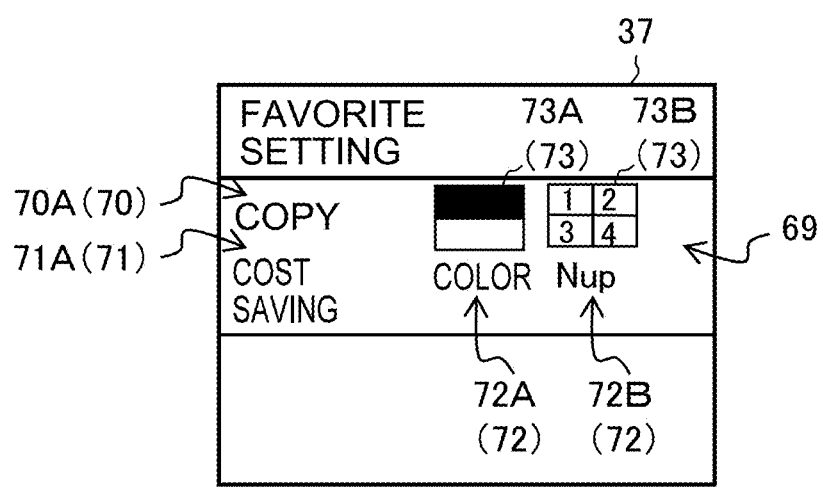
FIG. 3C shows a first display example of a list screen.

FIG. 3A shows a display example of the change screen on which a setting value of a setting item in each type of function can be changed, FIG. 3B shows a display example of the setting screen on which a setting related to the setting value changed on the change screen is performed, and FIG. 3C shows a first display example of the list screen.

The change screen shown in FIG. 3A includes a first display section 60 on the upper side of the screen, a second display section 61 on the middle side of the screen, and a third display section 62 on the lower side of the screen.

The first display section 60 is a portion that displays the type of each type of function that is scheduled to be executed. In FIG. 3A, a text "copy" is displayed on the first display section 60 as an example.

The second display section 61 is a portion that displays a setting item indicating a setting value of the pin changed from a setting value serving as a reference for each type of function (hereinafter, referred to as a "reference setting value") and a setting value of each setting item. The user changes the setting value from the reference setting value by performing a predetermined operation on the operation unit 38 on the change screen. In FIG. 3A, a text "color mode black and white, Nup 4up" is displayed on the second display section 61 as an example. That is, FIG. 3A shows that a setting value of a setting item "color mode" is "black and white" and a setting value of a setting item "Nup" is "4up".

The third display section 62 is a portion that displays various icons. In FIG. 3A, four icons of the icon 63, an icon 64, an icon 65, and an icon 66 are displayed on the third display section 62 as an example.

The icon 63 is an icon for displaying the list screen on the display unit 37 when operated by the user.

The icon 64 is an icon for displaying a home screen (not shown) on the display unit 37 in a case where an operation by the user is received.

The icon 65 is an icon for displaying a setting screen on the display unit 37 when operated by the user.

The icon 66 is an icon for executing each type of function displayed on the first display section 60 when operated by the user.

Two icons, an icon 67 and the icon 68, are displayed on the setting screen shown in FIG. 3B.

The icon 67 is an icon for resetting the setting value changed on the change screen to the reference setting value when operated by the user.

The icon 68 is an icon for registering the pin corresponding to the setting value changed on the change screen in the favorite setting when operated by the user.

Here, in a case where the icon 68 is operated by the user, the CPU 31 registers the pin and determines the identification information of the registered pin to be displayed on the list screen. This will be described below in detail.

The list screen shown in FIG. 3C is provided with a fourth display section 69.

The fourth display section 69 is a portion that displays a list of the pins. In FIG. 3C, one pin is displayed on fourth display section 69 as an example.

Here, the list screen displays the identification information corresponding to the pin. In the first embodiment, a "function name 70" indicating the type of each type of function in text, a "use purpose name 71" indicating a purpose of using the setting value of the pin in text, a "setting item name 72" indicating the setting item in text, and an "icon 73" indicating the setting item with an icon are displayed as the identification information on the display unit 37.

FIG. 3C shows a case where a content of the change screen shown in FIG. 3A is registered as the pin as an example, and "copy" is displayed as a function name 70A, "cost saving" is displayed as a use purpose name 71A, "color" is displayed as a setting item name 72A, and "Nup" is displayed as a setting item name 72B. As described above, the use purpose name 71A shows for what purpose the user uses the pin based on a difference between the reference setting value and the setting value of the pin. In addition, an icon 73A corresponding to the setting item "color mode" is displayed above the setting item name 72A, and an icon 73B corresponding to the setting item "Nup" is displayed above the setting item name 72B.

Next, a relationship between the use purpose and the use purpose name 71 will be described.

FIG. 4 is a first explanatory diagram showing the relationship between the use purpose and the use purpose name 71. The CPU 31 determines the use purpose of the pin and then determines the use purpose name 71 corresponding to the determined use purpose as the identification information by referring to the explanatory diagram shown in FIG. 4. Details thereof will be described below.

In the first embodiment, three use purposes, "cost", "quality", and "security", are provided. In the first embodiment, in a case where the use purpose is "cost", the use purpose name 71 is "cost saving", in a case where the use purpose is "quality", the use purpose name 71 is "high quality", and in a case where the use purpose is "security", the use purpose name 71 is "security function enabled" as shown in FIG. 4.

Next, a method of determining the use purpose of the pin by the CPU 31 will be described.

FIG. 5A is an explanatory diagram showing a relationship between a setting item for copy and a use purpose, FIG. 5B is an explanatory diagram showing a relationship between a setting item for fax and a use purpose, and FIG. 5C is an explanatory diagram showing a relationship between a setting item for scan and a use purpose. The relationships between a setting item and a use purpose shown in FIGS. 5A, 5B, and 5C are stored in advance in the storage unit 36 of the image forming device 20, and are used by the CPU 31 to determine the identification information of the pin. The configurations of FIGS. 5A, 5B, and 5C are basically similar to each other. Therefore, the relationship between a setting item for fax and a use purpose will be described below with reference to FIG. 5B as an example.

As shown in FIG. 5B, examples of the setting item for fax whose setting value can be arbitrarily changed by the user include "recipient" for setting a recipient, "time designation" for designating a time for transmitting a fax, "image quality" for designating an image quality, "transmission sheet" for designating the presence or absence of a transmission sheet, "density" for designating a density, "double-sided" for designating whether or not to perform double-sided printing, and "recipient confirmation" for designating whether or not to confirm the recipient. In addition, cost, quality, and security are provided as the use purposes for fax as an example.

In FIG. 5B, a cell in which "o" is displayed indicates that a corresponding setting item has the highest correlation with a corresponding use purpose. For example, the setting item "recipient" has the highest correlation with the use purpose "security". The relationship between a setting item and a use purpose shown in FIG. 5 is an example, and the relationship is not limited to the content shown in FIG. 5, and another relationship between a setting item and a use purpose may be defined.

Here, the CPU 31 extracts a difference between the reference setting value and the setting value of the pin when registering the pin. Specifically, the CPU 31 extracts, as the difference, a setting item whose setting value has been changed from the reference setting value and a content of the setting value changed from the reference setting value. Then, the CPU 31 scores the extracted difference between the reference setting value and the setting value of the pin by a predetermined method.

FIG. 6 is an explanatory diagram showing a score assigned according to each use purpose for fax. The score assigned according to each use purpose shown in FIG. 6 is stored in advance in the storage unit 36 of the image forming device 20, and is used by the CPU 31 to determine the identification information of the pin. Although not shown, scores assigned according to the use purposes for copy and scan are also stored in advance in the storage unit 36.

In the first embodiment, a score to be assigned varies depending on the type of the use purpose. Specifically, a score in a case where the use purpose is "cost" is "3", a score in a case where the use purpose is "quality" is "1", and a score in the case where the use purpose is "security" is "2" as shown in FIG. 6.

FIG. 7 is a first explanatory diagram showing the setting values changed from the reference setting values. Specifically, FIG. 7 shows a case where the CPU 31 extracts the setting values of the setting items "recipient", "image quality", "transmission sheet", and "recipient confirmation" as the differences between the reference setting values and the setting values of the pin. In this case, the CPU 31 determines "recipient", "image quality", "transmission sheet", and "recipient confirmation" as the setting items of the pin as the identification information, and determines "fax" as the type of each type of function of the pin as the identification information. In FIG. 7, a portion corresponding to the difference between the reference setting value and the setting value of the pin extracted by the CPU 31 is surrounded by a broken line.

The reference setting value before the change is "unspecified" and the setting value after the change is "specified" for the setting item "recipient"; the reference setting value is "standard" and the setting value after the change is "high image quality" for the setting item "image quality"; the reference setting value is "none" and the setting value after the change is "present" for the setting item "transmission sheet"; and the reference setting value is "disabled" and the setting value after the change is "enabled" for the setting item "recipient confirmation", as shown in FIG. 7.

At this time, the CPU 31 sums the scores assigned to a use purpose having the highest correlation with the setting items extracted as the differences between the reference setting values and the setting values of the pin for each use purpose. In FIG. 7, the CPU 31 calculates the total score of the use purpose "cost" as "0", calculates the total score of the use purpose "quality" as "2", and calculates the total score of the use purpose "security" as "4".

Then, the CPU 31 determines a use purpose whose calculated total score is the highest as the use purpose of the pin. In FIG. 7, the CPU 31 determines "security" as the use purpose of the pin as the identification information. In this case, the CPU 31 determines "security function enabled" as the use purpose name 71 with reference to the explanatory diagram shown in FIG. 4.

In a case where the total scores of a plurality of use purpose are the same as each other, the CPU 31 determines the use purpose based on a predetermined priority. Three types of priorities, "high", "medium", and "low" are provided, and any one of the above three types of priorities is assigned according to the type of the use purpose. In the first embodiment, the use purpose "quality" is assigned with the priority "low", the use purpose "security" is assigned with the priority "medium", and the use purpose "cost" is assigned with the priority "high". In the first embodiment, "cost", which is the use purpose leading to suppression of consumption of resources (for example, a recording medium, a toner, and the like) of the user, saving of costs required for execution of each type of function, and the like, has the highest priority as an example. Further, in the first embodiment, "security", which is the user purpose leading to suppression of erroneous transmission, concealment of transmission data, and the like, has the second highest priority as an example.

Here, in a case where the total scores of a plurality of use purpose are the same as each other, the CPU 31 determines a use purpose having the highest priority among the plurality of use purposes as the use purpose of the pin. For example, in a case where the total scores of the use purposes "security" and "quality" as the plurality of use purposes described above are the same as each other, the CPU 31 determines "security" having a higher priority as the use purpose of the pin.

The relationship between a use purpose and a priority is an example, and another priority other than the above may be given. For example, the use purpose "quality" may be assigned with the priority "low", the use purpose "cost" may be assigned with the priority "medium", and the use purpose "security" may be assigned with the priority "high". In addition, the use purpose corresponding to each priority may vary depending on the type of each type of function.

Next, a display example of the list screen in a case where the pin based on the difference between the reference setting value and the setting value of the pin shown in FIG. 7 is registered will be described.

Figure 8A:
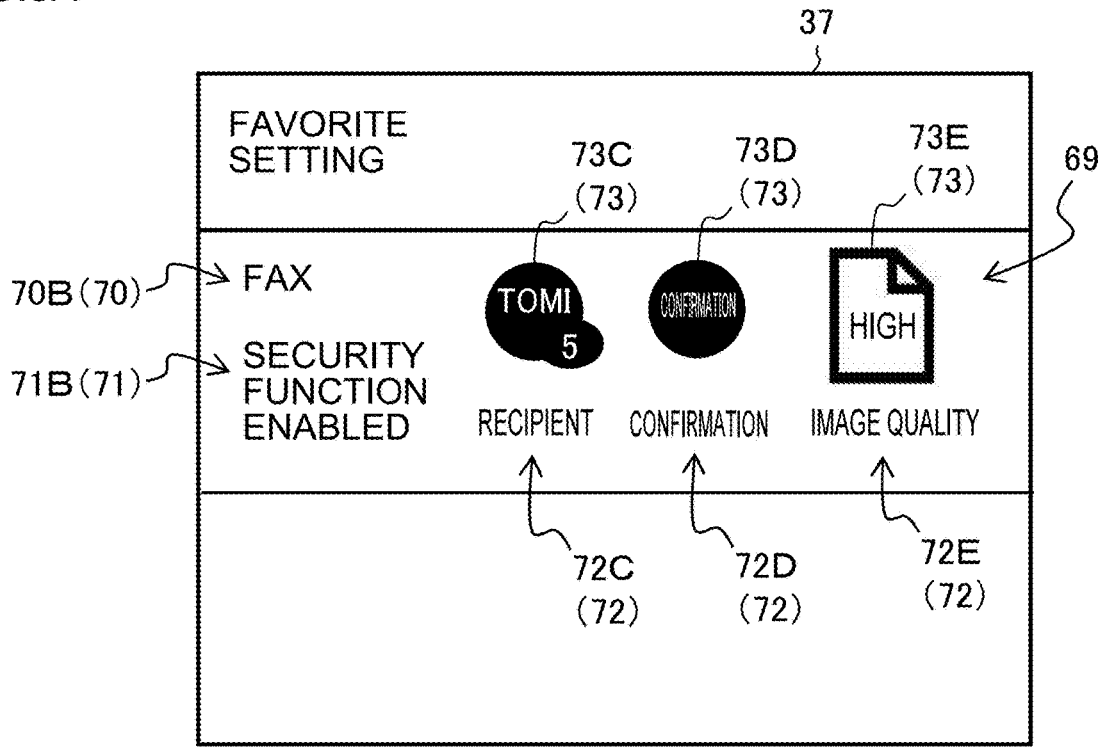
FIG. 8A shows a second display example of the list screen.
Figure 8B:
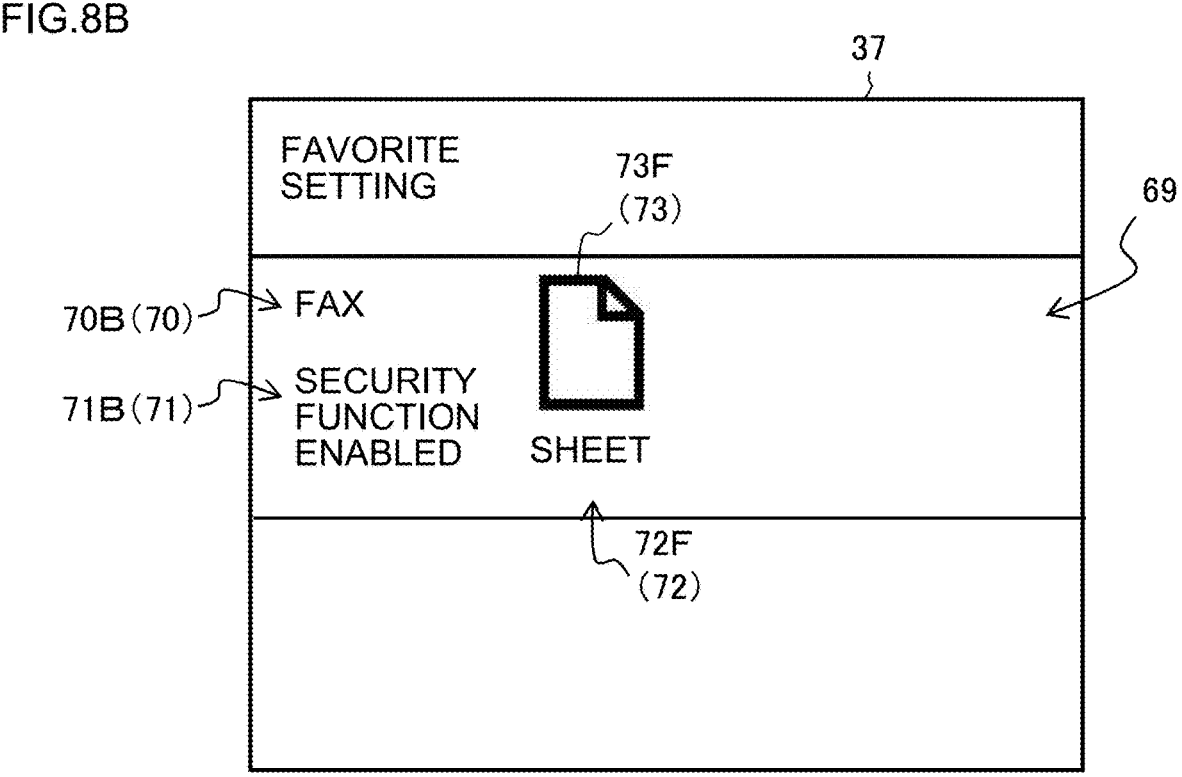
FIG. 8B shows a third display example of the list screen.

FIG. 8A shows a second display example of the list screen, and FIG. 8B shows a third display example of the list screen.

A function name 70B, a use purpose name 71B, setting item names 72C to 72E, and icons 73C to 73E are displayed as the identification information in the fourth display section 69 shown in FIG. 8A. In the first embodiment, since there is a possibility that the user cannot identify a setting item only with the icon 73, an item name of the setting item is displayed with the setting item name 72, and then the icon 73 corresponding to the setting item name 72 is displayed.

For example, in FIG. 8A, "fax" is displayed as the function name 70B, "security function enabled" is displayed as the use purpose name 71B, "recipient" is displayed as the setting item name 72C, "confirmation" is displayed as the setting item name 72D, and "image quality" is displayed as the setting item name 72E. Furthermore, the icon 73C corresponding to the setting item "recipient" is displayed above the setting item name 72C, the icon 73D corresponding to the setting item "recipient confirmation" is displayed above the setting item name 72D, and the icon 73E corresponding to the setting item "image quality" is displayed above the setting item name 72E.

Here, in the first embodiment, the CPU 31 displays, on the display unit 37, the top three setting items having high priorities among the setting items whose setting values have been changed from the reference setting values in the list screen. In the first embodiment, there are three setting items that can be displayed on one screen of the display unit 37. Any one of "high", "medium", and "low" is assigned as the priority of a setting item according to the type of the use purpose having the highest correlation with the setting item. In the first embodiment, the priority "low" is assigned to the setting item having the highest correlation with the use purpose "quality", the priority "medium" is assigned to the setting item having the highest correlation with the use purpose "security", and the priority "high" is assigned to the setting item having the highest correlation with the use purpose "cost".

Therefore, the CPU 31 displays both "recipient" and "recipient confirmation" having "medium" priority and one (for example, image quality) of "image quality" and "transmission sheet" having "low" priority among "recipient", "image quality", "transmission sheet", and "recipient confirmation", which are the setting items of the pin shown in FIG. 8, on an initial screen of the list screen shown in FIG. 8A in preference to the other of "image quality" and "transmission sheet" (for example, transmission sheet).

Here, in the first embodiment, since a setting item having the fourth highest priority or lower cannot be displayed on the one screen of the display unit 37, the CPU 31 performs carousel display for the setting items. The carousel display is a display mode in which the setting item name 72 and the icon 73 displayed on the display unit 37 are changed when a predetermined time elapses.

The function name 70B, the use purpose name 71B, a setting item name 72F, and an icon 73F are displayed as the identification information in the fourth display section 69 shown in FIG. 8B. The display example shown in FIG. 8B shows a state after a predetermined time has elapsed since the display example shown in FIG. 8A is displayed on the display unit 37.

For example, in FIG. 8B, "fax" is displayed as the function name 70B, "security function enabled" is displayed as the use purpose name 71B, and "sheet" is displayed as the setting item name 72F. The icon 73F corresponding to the setting item "transmission sheet" is displayed above the setting item name 72F.

After a predetermined time has elapsed since the setting item name 72F and the icon 73F are displayed on the display unit 37, the CPU 31 changes the setting item name 72 and the icon 73 displayed on the display unit 37 in such a way as to display the setting item names 72C to 72E and the icons 73C to 73E again.

FIG. 9 is a first explanatory diagram of the carousel display. In the first embodiment, the setting items to be displayed on the display unit 37 are managed in units of pages, and FIG. 9 shows the setting items of the first page and the second page as an example.

First, the CPU 31 causes the display unit 37 to display the function name 70, the use purpose name 71, the setting item names 72C to 72E, and the icons 73C to 73E as the identification information. Then, after a predetermined time has elapsed since the setting item names 72C to 72E and the icons 73C to 73E are displayed on the display unit 37, the CPU 31 changes the setting item names 72 and the icons 73 displayed on the display unit 37 in such a way as to display the setting item name 72F and the icon 73F. At this time, the CPU 31 fixedly displays the function name 70 and the use purpose name 71 at the foremost portion of the display unit 37 in a width direction, for example, at the left end of the display unit 37. That is, even in a case where the setting item name 72 and the icon 73 displayed on the display unit 37 are changed, the CPU 31 continues to display the function name 70 and the use purpose name 71 at the left end of the display unit 37. The width direction is an example of a "predetermined direction", and the left end is an example of a "foremost portion".

In the first embodiment, in a case where the number of pages of the setting items for which the carousel display is to be performed is large, a load on the CPU 31 increases, and thus the upper limit of the number of pages is set to two. However, the upper limit of the number of pages for which the carousel display is to be performed is not limited to two, and may be three or more.

In the first embodiment, the setting items are displayed on the display unit 37 in the form of icons and texts as the identification information as described above. A relationship between the icon and the text for a setting item will be described below.

Figure 10:
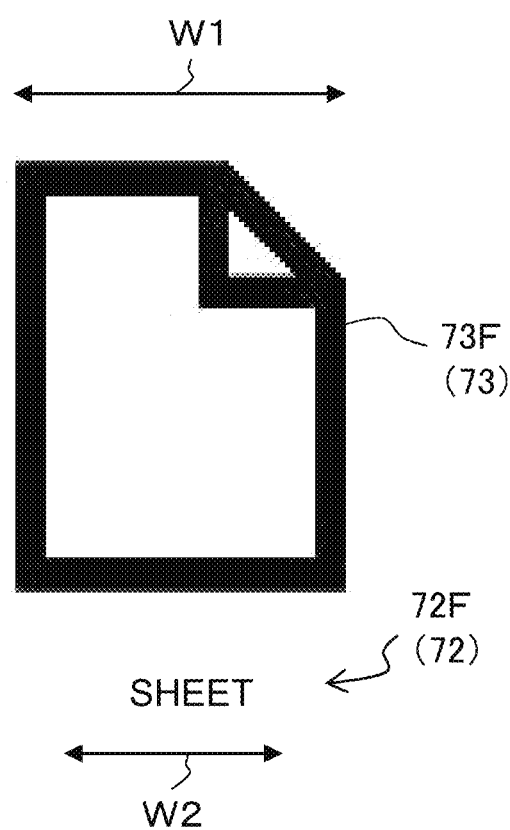
FIG. 10 shows a display example of identification information of a setting item "transmission sheet".

FIG. 10 shows a display example of the identification information of the setting item "transmission sheet". As shown in FIG. 10, the setting item "transmission sheet" includes, as the identification information, the setting item name 72F indicated by a text "sheet" and the icon 73F displayed above the setting item name 72F.

Here, the CPU 31 adjusts a text size of the setting item name 72 in such a way as to fall within a width of the icon 73. In a case where the text size of the setting item name 72 falling within the width of the icon 73 is smaller than a predetermined size, the CPU 31 shortens a text string of the setting item name 72F and displays the shortened text string on the display unit 37. For the setting item "transmission sheet" shown in FIG. 10, the text string of the setting item name 72F is shortened from "transmission sheet" to "sheet". A shortened form obtained by shortening the text string of the setting item name 72 is predetermined according to the type of the setting item name 72. A text size W2 of the setting item name 72F falls within the width W1 of the icon 73F in FIG. 10 as a result of adjusting the text size of the setting item name 72 by the CPU 31.

As described above, in the image forming device 20, setting values according to the setting items such as the color mode, the recipient, and the image quality can be set for each type of function. At this time, it is desirable to display identification information such as a name so that a content of each type of function to be executed according to the setting value can be identified in the case of setting the setting values.

Here, in a case where the identification information is displayed on the display unit 37 of the image forming device 20, the following problems are assumed. For example, in a case where the name of the pin is displayed in a text string as the identification information on the display unit 37, if the name of the pin is long, the text string cannot be entirely displayed on one screen, and there is a possibility that the content of each type of function to be executed according to the setting value cannot be identified from the text string on one screen. In addition, it is also conceivable to display the entire text string of the name of the pin name on one screen by reducing the size of the text displayed on the display unit 37, but in this case, the size of the displayed text is reduced, as a result of which there is a possibility that the content of each type of function to be executed according to the setting value cannot be identified from the text string. On the other hand, in the first embodiment, the CPU 31 receives the favorite setting of the image forming device 20. Then, the CPU 31 displays, on the display unit 37, the identification information which is determined according to the setting value of the pin in the received favorite setting and with which the content of each type of function to be executed according to the setting value of the pin can be identified. The content of each type of function includes the type of each type of function, the use purpose of the pin, and the setting item of the pin. As a result, according to the first embodiment, it is possible to allow the user to identify the content of each type of function of the image forming device 20 executed according to the setting value from the identification information displayed on the display unit 37. Further, in the first embodiment, since the CPU 31 determines the identification information of the pin and displays the identification information on the display unit 37 without manual operation, it is possible to reduce time and effort for the user to input the identification information. For example, in a case where the favorite setting is shared and used by a plurality of users, it is necessary for all the users to input the identification information with which the content of each type of function to be executed according to the setting value can be identified. However, according to the configuration of the first embodiment, there is no burden on the user to input the identification information.

Then, in the first embodiment, the CPU 31 causes the display unit 37 to display the type of each type of function and the use purpose of the pin in text as the identification information, and causes the display unit 37 to display the setting item of the pin with an icon and a text. As a result, according to the first embodiment, the type of each type of function and the use purpose of the pin can be identified by the user from the text displayed on the display unit 37, and the setting item of the pin can be identified by the user from the icon and the text displayed on the display unit 37.

In the first embodiment, the CPU 31 causes the display unit 37 to display, as the identification information, a setting item whose setting value has been changed from the reference setting value of each type of function of the image forming device 20, with an icon and a text. As a result, according to the first embodiment, the amount of information to be displayed on the display unit 37 can be reduced as compared with a configuration in which the setting items corresponding to all the setting values of the pin in the favorite setting are displayed.

In the first embodiment, the CPU 31 displays the type of each type of function and the use purpose of the pin in text at the foremost portion of the display unit 37 in the width direction, for example, the left end of the display unit 37. In the first embodiment, the type of each type of function is displayed at the foremost portion of the display unit 37 in the width direction in order to notify at least the user who looks at the pin which function the pin corresponds to. As a result, according to the first embodiment, it is possible to allow the user to more easily identify each type of function corresponding to each pin in the favorite setting from the identification information displayed on the display unit 37, as compared with a configuration in which the type of each type of function is displayed at a portion other than the foremost portion of the display unit 37 in the width direction.

Further, in the first embodiment, in a case where the setting items of the identification information cannot be entirely displayed on one screen of the display unit 37, the CPU 31 performs carousel display for the setting items. A case where the setting items cannot be entirely displayed on one screen of the display unit 37 is a case where the number of setting items whose setting values have been changed from the reference setting values exceeds a predetermined number of setting items that can be displayed on one screen of the display unit 37. In the first embodiment, the carousel display is performed for the setting items, as a result of which it is possible to allow the user to identify all the setting items whose setting values have been changed from the reference setting values. Then, according to the first embodiment, it is possible to allow the user to easily identify each setting item as compared with a configuration in which all the setting items are displayed on one screen of the display unit 37.

Second Embodiment

Next, a second embodiment will be described while omitting or simplifying a portion overlapping with other embodiments.

Figure 11A:
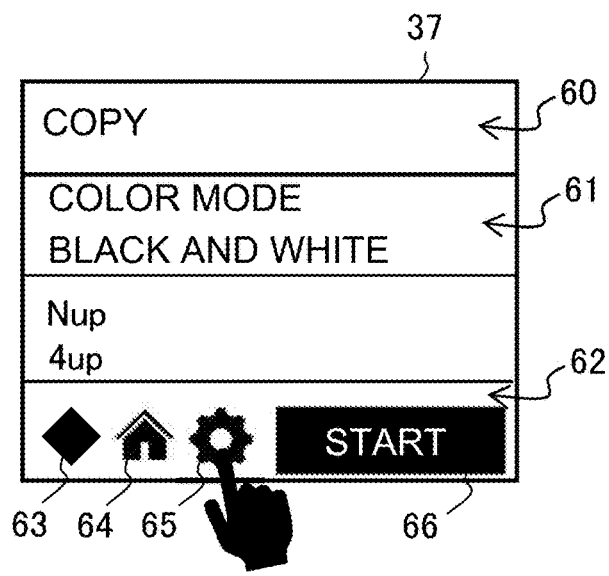
FIG. 11A shows a display example of the change screen.
Figure 11B:
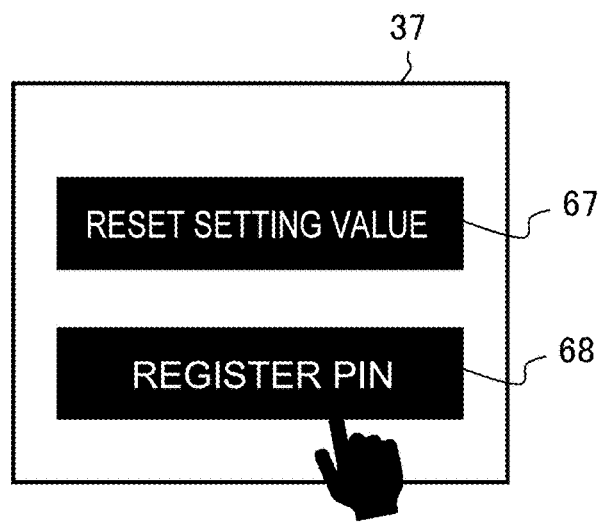
FIG. 11B shows a display example of the setting screen.
Figure 11C:
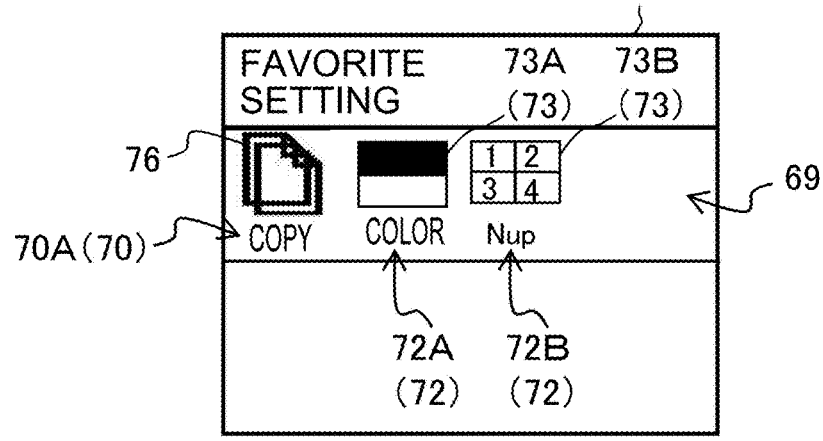
FIG. 11C shows a fourth display example of the list screen.

FIG. 11A shows a display example of a change screen, FIG. 11B shows a display example of a setting screen, and FIG. 11C shows a fourth display example of a list screen. The change screen of FIG. 11A and the setting screen of FIG. 11B are similar to the change screen of FIG. 3A and the setting screen of FIG. 3B, respectively, and thus, a description thereof is omitted.

A function name 70A, an icon 76, setting item names 72A and 72B, and icons 73A and 73B are displayed as identification information in a fourth display section 69 shown in FIG. 11C.

In FIG. 11C, "copy" is displayed as the function name 70A, "color" is displayed as the setting item name 72A, and "Nup" is displayed as the setting item name 72B as an example. The icon 76 corresponding to each type of function "copy" is displayed above the function name 70A, the icon 73A corresponding to the setting item "color mode" is displayed above the setting item name 72A, and the icon 73B corresponding to the setting item "Nup" is displayed above the setting item name 72B.

As described above, in the second embodiment, a CPU 31 causes a display unit 37 to display the type of each type of function and a setting item of a pin as the identification information with icons and texts. Therefore, according to the second embodiment, it is possible to allow the user to identify the type of each type of function and the setting item of the pin from the icon and the text displayed on the display unit 37.

Next, carousel display in the second embodiment will be described with reference to FIGS. 12 and 13.

Figure 12A:
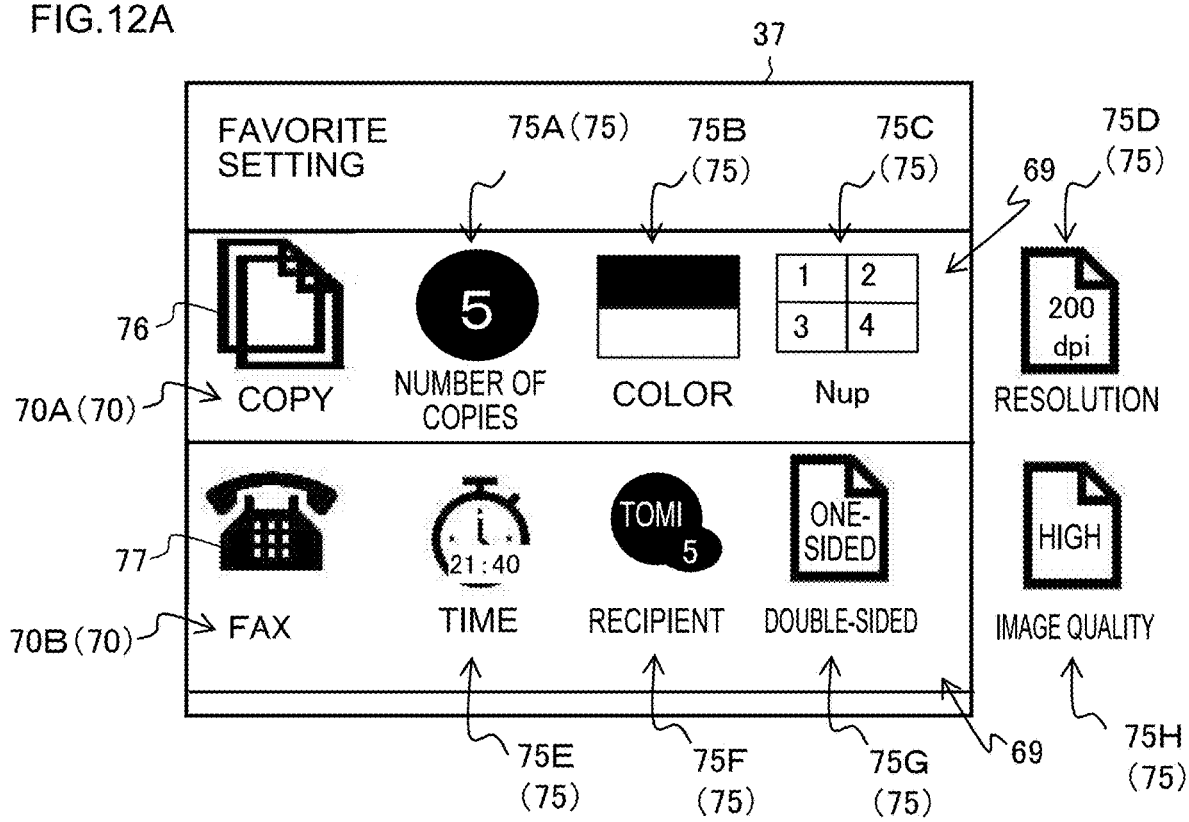
FIG. 12A is a second explanatory diagram of the carousel display.
Figure 12B:
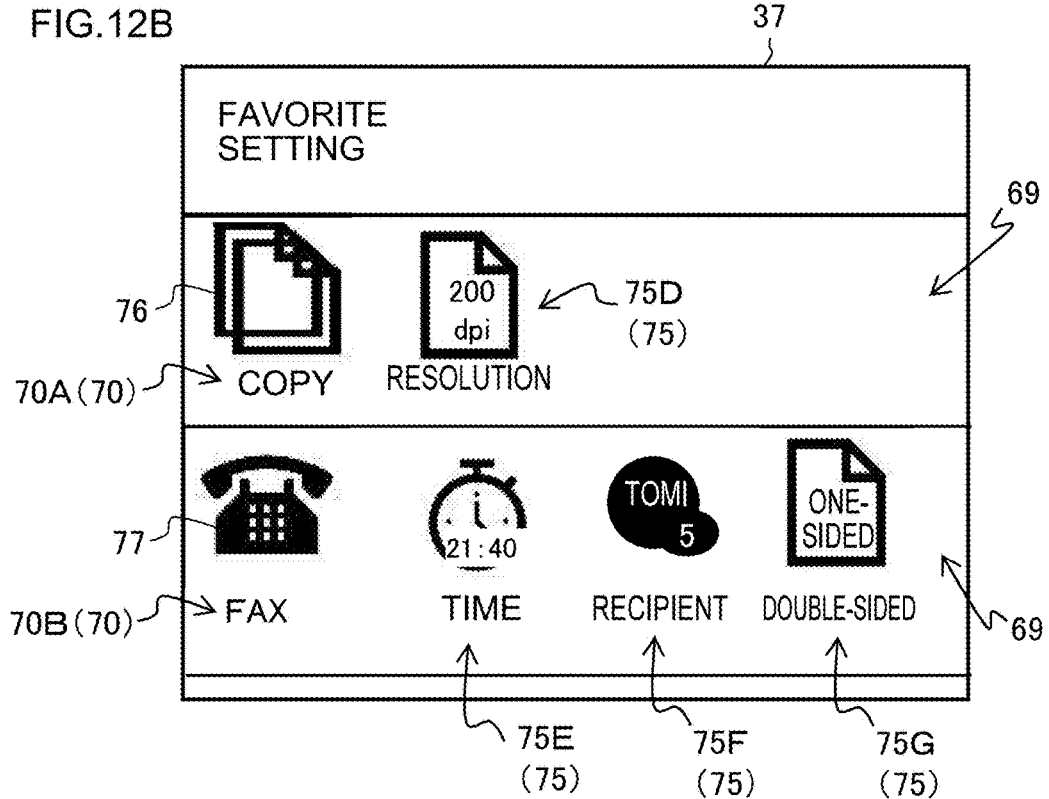
FIG. 12B is a third explanatory diagram of the carousel display.
Figure 13A:
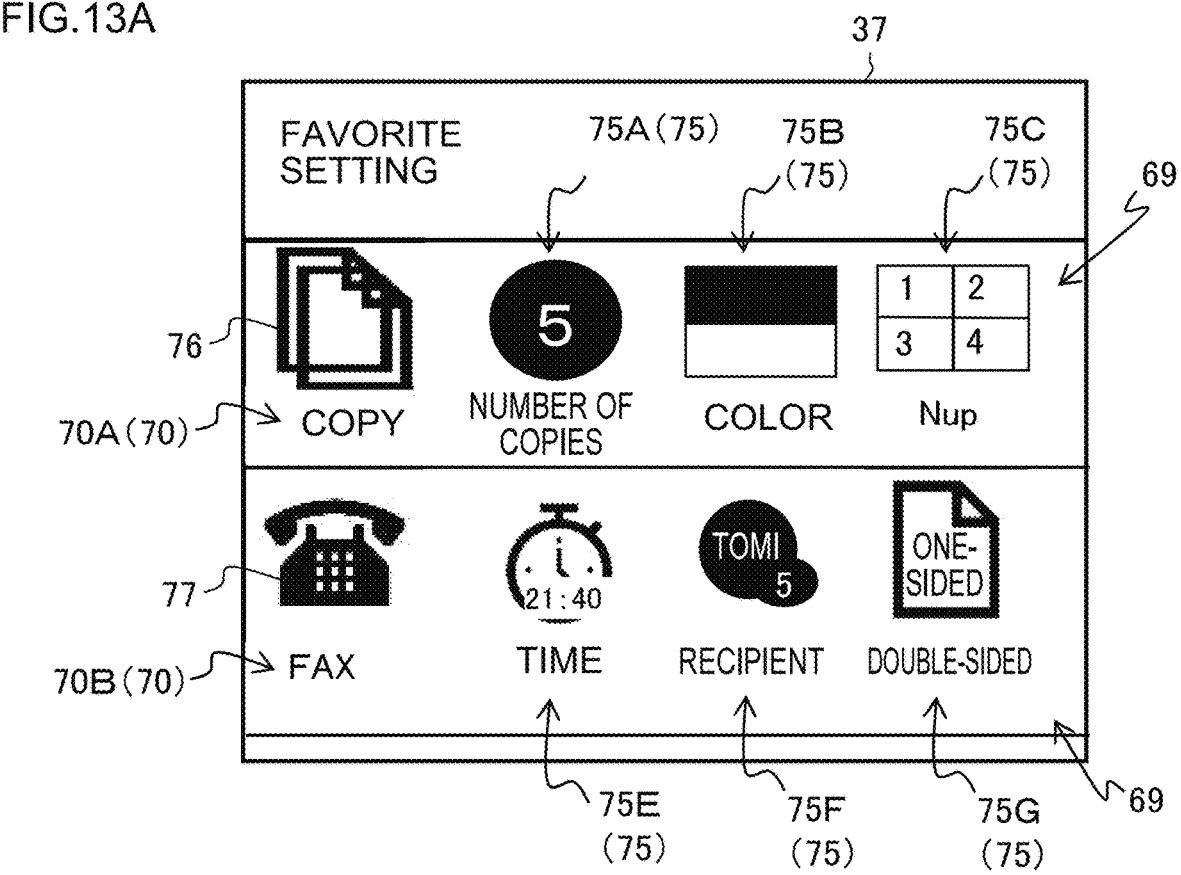
FIG. 13A is a fourth explanatory diagram of the carousel display.
Figure 13B:
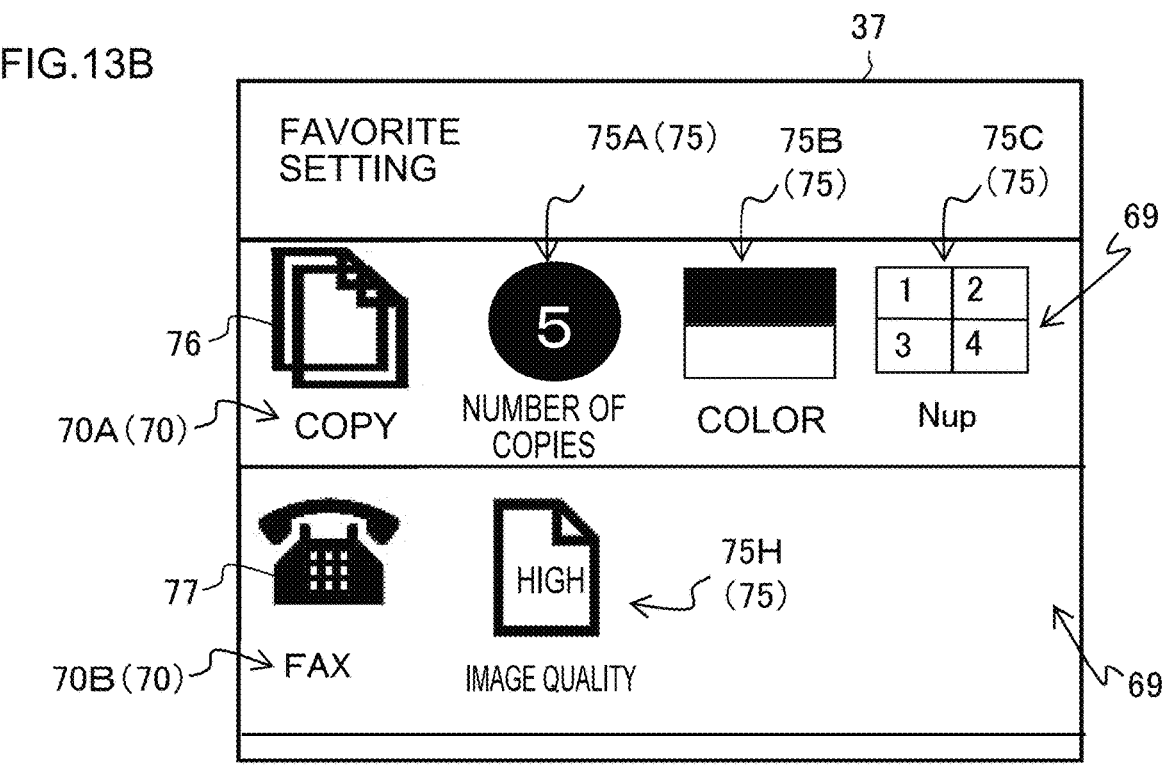
FIG. 13B is a fifth explanatory diagram of the carousel display.

FIG. 12A is a second explanatory diagram of the carousel display, FIG. 12B is a third explanatory diagram of the carousel display, FIG. 13A is a fourth explanatory diagram of the carousel display, and FIG. 13B is a fifth explanatory diagram of the carousel display.

In FIGS. 12 and 13, two pins are displayed on the list screen as an example. Hereinafter, a pin displayed in the upper fourth display section 69 in the list screen of FIGS. 12 and 13 is referred to as a "first pin", and a pin displayed in the lower fourth display section 69 is referred to as a "second pin". The first pin includes four setting items of "number of copies", "color mode", "Nup", and "resolution", and the second pin includes four setting items of "time designation", "recipient", "double-sided", and "image quality". The setting items "number of copies", "color mode", "Nup", "resolution", "time designation", "recipient", "double-sided", and "image quality" in the list screen of FIGS. 12 and 13 are described as a setting item 75A, a setting item 75B, a setting item 75C, a setting item 75D, a setting item 75E, a setting item 75F, a setting item 75G, and a setting item 75H, respectively.

In FIG. 12A, the function name 70A, the icon 76, and the setting items 75A to 75C are displayed as the identification information in the upper fourth display section 69 as an example. In FIG. 12A, a function name 70B, an icon 77, and the setting items 75E to 75G are displayed as the identification information in the lower fourth display section 69.

In FIG. 12A, the setting item 75D displayed outside the display unit 37 indicates a setting item of the second page for which the carousel display is to be performed in the upper fourth display section 69, and the setting item 75H displayed outside the display unit 37 indicates a setting item of the second page for which the carousel display is to be performed in the lower fourth display section 69.

Here, in a case where none of setting items of a plurality of pins is entirely displayed on one screen of the display unit 37 in the list screen, the CPU 31 perform the carousel display for each pin in a predetermined order. In the second embodiment, an order from the top to the bottom is set as the predetermined order as an example.

In FIG. 12B, the function name 70A, the icon 76, and the setting item 75D are displayed as the identification information in the upper fourth display section 69. In FIG. 12B, a display content of the lower fourth display section 69 is similar to that in FIG. 12A. The display example shown in FIG. 12B shows a state after a predetermined time has elapsed since the display example shown in FIG. 12A is displayed on the display unit 37. In this case, the CPU 31 changes setting item names 75 displayed on the upper fourth display section 69 in such a way as to display the setting item 75D instead of the setting items 75A to 75C.

In FIG. 13A, the display contents of the upper fourth display section 69 and the lower fourth display section 69 are similar to those in FIG. 12A. The display example shown in FIG. 13A shows a state after a predetermined time has elapsed since the display example shown in FIG. 12B is displayed on the display unit 37. In this case, the CPU 31 changes the setting item name 75 displayed in the upper fourth display section 69 in such a way as to display the setting items 75A to 75C instead of the setting item 75D.

In FIG. 13B, the display content of the upper fourth display section 69 is similar to that in FIG. 13A. In FIG. 13B, the function name 70B, the icon 77, and the setting item 75H are displayed as the identification information in the lower fourth display section 69. In this case, the CPU 31 changes the setting item names 75 displayed in the lower fourth display section 69 in such a way as to display the setting item 75H instead of the setting items 75E to 75G. Then, after a predetermined time has elapsed since the display example shown in FIG. 13B is displayed on the display unit 37, the CPU 31 changes the setting item name 75 displayed in the lower fourth display section 69 in such a way as to display the setting items 75E to 75G instead of the setting item 75H.

(Others)

In the above embodiments, in the case of setting a value with a range, such as time and scale, as a setting value of a setting item, the CPU 31 displays the set value in text on the icon 73 as the identification information of the setting item.

Figure 14:
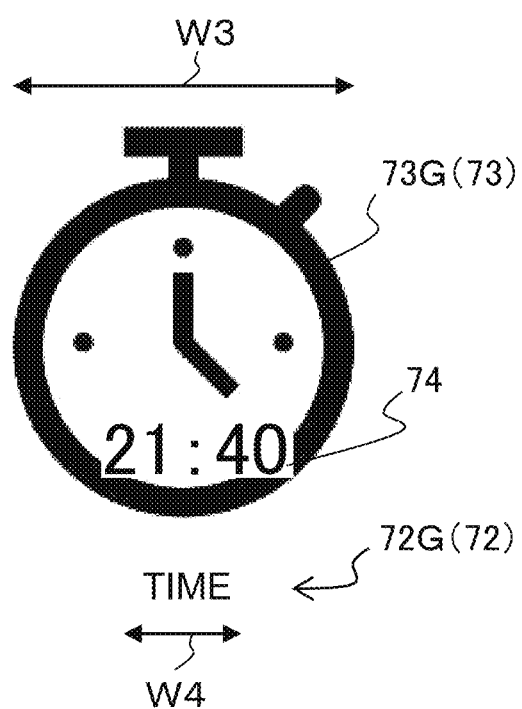
FIG. 14 shows a display example of identification information of a setting item "time designation".

FIG. 14 shows a display example of the identification information of the setting item "time designation". As shown in FIG. 14, the setting item "time designation" includes, as the identification information, a setting item name 72G indicated with a text "time", an icon 73G displayed above the setting item name 72G, and a setting value indicator 74 indicated with a text "21:40" superimposed on the icon 73G.

For the setting item "time designation" shown in FIG. 14, the text string of the setting item name 72G is shortened from "time designation" to "time". A text size W4 of the setting item name 72G falls within a width W3 of the icon 73G in FIG. 14 as a result of adjusting the text size of the setting item name 72 by the CPU 31.

In the above embodiments, the number of use purposes of the pin is limited to one, but the present invention is not limited thereto, and a plurality of use purposes may be determined.

FIG. 15A is a second explanatory diagram showing setting values changed from reference setting values. Specifically, FIG. 15A shows a case where the CPU 31 extracts the setting values of the setting items "recipient", "image quality", and "transmission sheet" as the differences between the reference setting values and the setting values of the pin. In FIG. 15A, a portion corresponding to the difference between the reference setting value and the setting value of the pin extracted by the CPU 31 is surrounded by a broken line.

The reference setting value before the change is "unspecified", and the setting value after the change is "specified" for the setting item "recipient"; the reference setting value is "standard" and the setting value after the change is "high image quality" for the setting item "image quality"; and the reference setting value is "none" and the setting value after the change is "present" for the setting item "transmission sheet", as shown in FIG. 15A.

In FIG. 15A, the CPU 31 calculates the total score of the use purpose "cost" as "0", calculates the total score of the use purpose "quality" as "2", and calculates the total score of the use purpose "security" as "2". In this case, the CPU 31 determines, as the use purposes of the pin, the use purposes "quality" and "security" whose total scores are the same as each other. In this case, the CPU 31 determines the use purpose names 71 as "security function enabled" and "high quality" with reference to the explanatory diagram shown in FIG. 4. As a result, the texts "security function enabled" and "high quality" are displayed as the use purpose names 71B in the display example of the display unit 37 of the image forming device 20 shown in FIG. 15B.

In the case of determining a plurality of use purposes, the use purposes of the pin are not limited to a plurality of use purposes whose total scores are the same as each other, and a plurality of use purposes whose total scores are within a predetermined range may be determined as the use purposes of the pin. In the case of determining a plurality of use purposes, the upper limit of the number of use purpose names 71 that can be displayed on the display unit 37 may be provided. For example, in a case where the upper limit of the number is two, when there are three use purposes whose total scores are within a predetermined range, the CPU 31 determines the top two use purposes whose scores are high as the use purposes of the pin, and displays two corresponding use purpose names 71. In addition, in a case where the upper limit of the number is two, when there are three use purposes whose total scores are the same as each other, the CPU 31 determines the top two use purposes having high priorities as the use purposes of the pin, and displays two corresponding use purpose names 71.

In the above embodiments, the use purpose and the use purpose name 71 have a one-to-one relationship as shown in FIG. 4, but the present invention is not limited thereto, and the use purpose and the use purpose name 71 may have a one-to-many relationship.

FIG. 16 is a second explanatory diagram showing the relationship between the use purpose and the use purpose name 71. FIG. 16 shows an example in which different use purpose names 71 are determined in relation to each type of function and setting items even for the same use purpose. As shown in FIG. 16, for example, in a case where the use purpose is "security", the CPU 31 determines "erroneous transmission prevention" as the use purpose name 71 if each type of function is "fax", and determines "secure transmission" as the use purpose name 71 if each type of function is "scan".

In the above embodiments, a score to be assigned varies depending on the type of the use purpose as shown in FIG. 6, but a method of determining the score is not limited thereto. For example, the assigned score may be different even for the same use purpose in a case where the type of each type of function is different.

In the above embodiments, an example of the information processing device is the image forming device 20, and the image forming device 20 executes display processing. However, the present invention is not limited thereto, and an example of the information processing device may be a server that can communicate with the image forming device 20, and the display processing may be executed by the server, and a result of the display processing may be displayed on the image forming device 20 or may be executed by the image forming device 20. In a case where the display processing is executed by the server, the result of the display processing is not limited to be displayed on the image forming device 20, and the result of the display processing may be displayed on another device such as a smartphone or a PC.

In each embodiment described above, the processor refers to a processor in a broad sense, and includes a general-purpose processor (for example, a central processing unit (CPU)) or a dedicated processor (for example, a graphics processing unit (GPU), an application specific integrated circuit (ASIC), a field programmable gate array (FPGA), or a programmable logic device).

In addition, the operation of the processor in each embodiment described above may be performed not only by one processor but also by a plurality of processors existing at physically separated positions in cooperation. In addition, the order of the respective operations of the processor is not limited to the order described in each embodiment described above, and may be changed, if appropriate.

The disclosure of Japanese Patent Application No. 2021-153036 is incorporated herein by reference in its entirety.

All documents, patent applications, and technical standards mentioned herein are incorporated herein by reference to the same extent as if each individual document, patent application, and technical standard were specifically and individually stated.

What is claimed is:

1. An information processing device, comprising:
    a processor, wherein the processor is configured to:
    receive a setting value of a predetermined function,
    cause a display unit to display identification information which is determined according to the setting value and with which a content of the predetermined function to be executed according to the setting value is identifiable,
    cause the display unit to display, as an icon, the setting value, which has been changed from the setting value serving as a reference for the predetermined function, as the identification information,
    determine whether to apply carousel display for the identification information in a case in which the identification information is not entirely displayable on one screen of the display unit, and
    perform carousel display such that, after a predetermined time has elapsed, a part of the identification information that is not entirely displayable on the one screen is displayed on the one screen.

2. The information processing device according to claim 1, wherein the processor is configured to cause the display unit to display, in text, at least one of a type of the predetermined function, a purpose of using the setting value, or a setting item indicating the setting value, as the identification information.

3. The information processing device according to claim 2, wherein: the identification information includes the type of the predetermined function, the purpose, and the setting item, and the processor is configured to cause the display unit to display the type of the predetermined function at a foremost portion of the display unit in a predetermined direction.

4. The information processing device according to claim 1, wherein the processor is configured to cause the display unit to display, as an icon, at least one of a type of the predetermined function or a setting item indicating the setting value, as the identification information.

5. The information processing device according to claim 4, wherein the processor is configured to cause the display unit to display, as text and an icon, the type of the predetermined function as the identification information.

6. The information processing device according to claim 4, wherein the processor is configured to cause the display unit to display, as an icon, the setting item, the setting value of which has been changed from the setting value serving as a reference for the predetermined function, as the identification information.

7. A non-transitory computer readable medium storing an information processing program executable by a computer to perform processing, the processing comprising:
receiving a setting value of a predetermined function;
causing a display unit to display identification information which is determined according to the setting value and with which a content of the predetermined function to be executed according to the setting value is identifiable,
causing the display unit to display, as an icon, the setting value, which has been changed from the setting value serving as a reference for the predetermined function, as the identification information,
determining whether to apply carousel display for the identification information in a case in which the identification information is not entirely displayable on one screen of the display unit, and
performing carousel display such that, after a predetermined time has elapsed, a part of the identification information that is not entirely displayable on the one screen is displayed on the one screen.

8. The information processing device according to claim 1, wherein the processor is configured to display, in a case in which the identification information is not entirely displayable on one screen of the display unit, the identification information of which the setting value serving as a reference for the predetermined function has been changed, in preference to other identification information on the one screen, and to perform carousel display such that, after a predetermined time has elapsed, the remaining identification information is displayed on the one screen.

* * * * *